(12) United States Patent
Masuko

(10) Patent No.: US 11,400,759 B2
(45) Date of Patent: Aug. 2, 2022

(54) PNEUMATIC TIRE

(71) Applicant: BRIDGESTONE CORPORATION, Tokyo (JP)

(72) Inventor: Yoshiyuki Masuko, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 161 days.

(21) Appl. No.: 16/491,394

(22) PCT Filed: Feb. 6, 2018

(86) PCT No.: PCT/JP2018/004018
§ 371 (c)(1),
(2) Date: Sep. 5, 2019

(87) PCT Pub. No.: WO2018/163693
PCT Pub. Date: Sep. 13, 2018

(65) Prior Publication Data
US 2020/0031169 A1  Jan. 30, 2020

(30) Foreign Application Priority Data
Mar. 8, 2017 (JP) .............................. JP2017-044145

(51) Int. Cl.
*B60C 9/26* (2006.01)
*B29D 30/30* (2006.01)

(52) U.S. Cl.
CPC .......... *B60C 9/263* (2013.01); *B29D 30/3035* (2013.01)

(58) Field of Classification Search
CPC ....... B60C 9/263; B60C 9/26; B60C 2200/02; B29D 30/1635; B29D 30/3035
(Continued)

(56) References Cited

U.S. PATENT DOCUMENTS

| 3,299,936 A | 1/1967 | Van Den Berg |
| 5,535,801 A * | 7/1996 | Iseki ...................... B60C 9/263 |
| | | 152/526 |

(Continued)

FOREIGN PATENT DOCUMENTS

| BE | 857640 A1 * | 2/1978 | ............. B60C 9/263 |
| CN | 1948033 A | 4/2007 | |

(Continued)

OTHER PUBLICATIONS

Hermann, Machine Translation of DE-2136341-A1 (Year: 1973).*

(Continued)

*Primary Examiner* — Robert C Dye
*Assistant Examiner* — Sedef E Paquette
(74) *Attorney, Agent, or Firm* — Oliff PLC

(57) ABSTRACT

A pneumatic tire includes: a carcass; at least one layer of a belt; and a tread, the belt including an endless belt layer having provided therein treats, each of the treats being formed by covering a cord with rubber and extending in zigzag fashion in the tire circumferential direction, in which in the endless belt layer, a front surface a and a rear surface of each of the treats are reversed at both tire widthwise ends, and on at least one tire widthwise end of the treats, a treat reversal position is, at least partially in the tire circumferential direction, displaced in the tire width direction from another treat reversal position adjacent in tire circumferential direction.

4 Claims, 5 Drawing Sheets

(58) Field of Classification Search
USPC .................................................. 152/526, 528
See application file for complete search history.

(56) References Cited

U.S. PATENT DOCUMENTS

| | | | |
|---|---|---|---|
| 5,683,543 A | 11/1997 | Morikawa et al. | |
| 2005/0194081 A1* | 9/2005 | Yano | B60C 9/22 152/527 |
| 2005/0217783 A1 | 10/2005 | Valle et al. | |
| 2006/0237114 A1* | 10/2006 | Takanami | B29D 30/3028 152/533 |
| 2007/0246141 A1* | 10/2007 | Itami | B29D 30/70 152/533 |
| 2012/0043001 A1 | 2/2012 | Karita | |
| 2013/0206307 A1 | 8/2013 | Itami | |
| 2016/0068026 A1 | 3/2016 | Okita | |
| 2018/0141382 A1 | 5/2018 | Miyazono | |

FOREIGN PATENT DOCUMENTS

| | | | |
|---|---|---|---|
| CN | 101583501 A | 11/2009 | |
| CN | 102405143 A | 4/2012 | |
| CN | 103153649 A | 6/2013 | |
| CN | 105142934 A | 12/2015 | |
| DE | 1033059 B | 6/1958 | |
| DE | 2162402 A1 | 10/1972 | |
| DE | 2136341 A1 * | 2/1973 | B60C 9/263 |
| DE | 2136341 A1 | 2/1973 | |
| DE | 19612410 A1 | 10/1996 | |
| EP | 0288499 B1 | 3/1991 | |
| EP | 0485136 A1 | 5/1992 | |
| EP | 0501782 A2 * | 9/1992 | B60C 9/263 |
| EP | 1621666 A2 | 2/2006 | |
| EP | 1967389 A1 | 9/2008 | |
| FR | 1153397 A | 3/1958 | |
| FR | 2130765 A5 | 11/1972 | |
| GB | 1361998 A | 7/1974 | |
| JP | S47-6351 A | 4/1972 | |
| JP | H02-81707 A | 3/1990 | |
| JP | H04-173404 A | 6/1992 | |
| JP | 2000-108611 A | 4/2000 | |
| JP | 2000-198317 A | 7/2000 | |
| JP | 2007-015638 A | 1/2007 | |
| JP | 2010260446 A * | 11/2010 | |
| JP | 2011-051451 A | 3/2011 | |
| JP | 2012-066798 A | 4/2012 | |
| JP | 2012-179850 A | 9/2012 | |
| JP | 2016-215943 A | 12/2016 | |
| WO | 2016/190048 A1 | 12/2016 | |

OTHER PUBLICATIONS

Nobuki Karita, JP-2010260446-A, machine translation. (Year: 2010).*
Sep. 28, 2020 Search Report issued in European Patent Application No. 18764019.8.
Sep. 10, 2019 International Preliminary Report on Patentability issued in International Patent Application No. PCT/JP2018/004018.
Dec. 18, 2020 Office Action issued in Chinese Patent Application No. 201880016098.6.
Apr. 17, 2018 International Search Report issued in International Patent Application No. PCT/JP2018/004018.

* cited by examiner

PNEUMATIC TIRE

TECHNICAL FIELD

This disclosure relates to pneumatic tires.

BACKGROUND

A conventional pneumatic tire is known to have a carcass extending toroidally between a pair of bead portions, a belt formed by at least one belt layer disposed outward in the tire radial direction of the carcass, and a tread disposed outward in the tire radial direction of the belt, in which the belt has an endless belt layer.

The endless belt layer is formed by, for example, treats, each being formed by covering a cord with rubber and directed so as to change its direction at both tire widthwise ends toward a tire width direction inner side such that it extends in zigzag fashion in the tire circumferential direction. In other words, each treat is formed by, for example, inclined portions and linear portions that are alternately repeated in the tire circumferential direction in the order of an inclined portion of 10° to 20° rising to the right with respect to the tire circumferential direction, a linear portion substantially parallel to the tire circumferential direction, an inclined portion of 10° to 20° rising to the left with respect to the tire circumferential direction, and a linear portion substantially parallel to the tire circumferential direction. A pneumatic tire having such an endless belt is described in, for example, JP2012-179850A (PTL 1).

CITATION LIST

Patent Literature

JP2012-179850A

SUMMARY

Technical Problem

However, in a structure like a conventional endless belt layer in which each treat is arranged with linear portions provided at both tire widthwise ends, the longer the linear portions, the wider the overlapping portions where redundant parts of the treats overlap one another at the linear portions will be. Since overlapping portions have an increased thickness as a result of overlapping one another, such portions may be crushed during vulcanization, and cords in the belt layer may come into contact with one another, providing a starting point of separation between belt layers.

On the other hand, if the linear portions are made too short, a bent portion that continues from a linear portion to an inclined portion will be lifted or turned up, and deflection easily occurs. In order to avoid such deflection at a bent portion, it is necessary to deviate the inclination angle of each bent portion as much as possible along the tire circumferential direction (for example, 10° to 20° with respect to the tire circumferential direction), and, for example, due to overlapping with a belt layer in the circumferential direction disposed inward in the tire radial direction of the endless belt layer, the rigidity is concentrated in the tire circumferential direction, and uneven shoulder wear tends to occur at increased frequency.

That is, if the linear portions are made too short, the inclination angle of each inclined portion is considerably restricted.

It would thus be helpful to provide a pneumatic tire that can prevent the occurrence of wide overlapping portions where redundant parts of treats forming an endless belt layer overlap one another, and that can reduce the restriction on the inclination angle of inclined portions of the treats to increase the degree of freedom in design.

Solution to Problem

To achieve the above object, a pneumatic tire according to the present disclosure comprises: a carcass extending toroidally between a pair of bead portions; a belt formed by at least one belt layer disposed outward in a tire radial direction of the carcass; and a tread disposed outward in the tire radial direction of the belt, the belt layer comprising an endless belt layer having provided therein treats, each of the treats being formed by covering a cord with rubber and directed so as to change its direction at both tire widthwise ends toward a tire width direction inner side such that the treat extends in zigzag fashion in the tire circumferential direction, wherein in the endless belt layer, a front surface and a rear surface of each of the treats are reversed at both tire widthwise ends, and on at least one tire widthwise end of the treats, a treat reversal position at which front and rear surfaces of each of the treats are reversed is, at least partially in the tire circumferential direction, displaced in the tire width direction from another treat reversal position adjacent in tire circumferential direction.

Solution to Problem

According to the present disclosure, it is possible to provide a pneumatic tire that can eliminate the occurrence of wide overlapping portions where redundant parts of treats forming an endless belt layer overlap one another, and that can reduce the restriction on the inclination angle of inclined portions of the treats to increase the degree of freedom in design.

DETAILED DESCRIPTION

Figure 1:
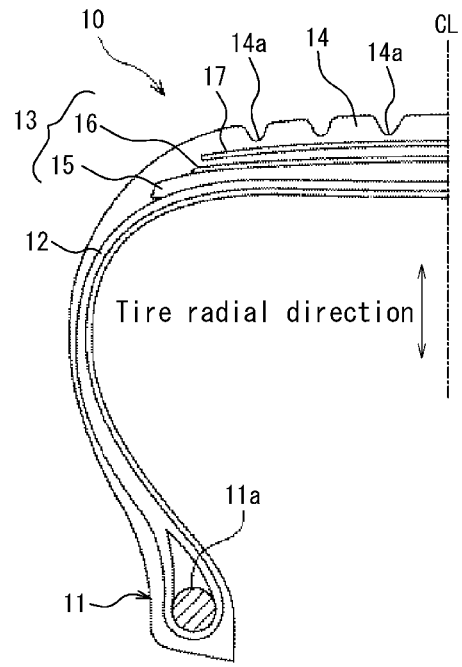
FIG. 1 is a cross-sectional view of a tire half portion of a pneumatic tire according to one of the disclosed embodiments of the present disclosure, taken along a cross section in the tire width direction.

Hereinafter, an embodiment for carrying out the present disclosure will be described with reference to the drawings. As illustrated in FIG. 1, a pneumatic tire 10 according to this embodiment comprises: a carcass 12 toroidally extending between a pair of bead portions 11; a belt 13 formed by at least one belt layer disposed outward in the tire radial direction of the carcass 12; and a tread 14 disposed outward in the tire radial direction of the belt 13. In FIG. 1, only one half of the tire in the tire width direction on one side of a tire equatorial plane CL is illustrated, and the other half, which has a line-symmetric inverted shape about the tire equatorial plane CL, is not illustrated.

The pneumatic tire 10 is, for example, an aircraft pneumatic tire (aircraft pneumatic radial tire or aircraft pneumatic bias tire). In this embodiment, each bead portion 11 is embedded with a cable bead-shaped bead core 11a covered with rubber in which a wire is spirally wound around an annular core, the belt 13 comprises a spiral belt layer 15 and an endless belt layer 16 disposed outward in the tire radial direction thereof, and the tread 14 is stacked on the belt 13 via a belt protective layer 17 which covers the belt 13 and is formed by, for example, a single layer of aramid fibers, and has provided therein only a plurality of circumferential grooves 14a along the tire circumferential direction.

The endless belt layer 16 according to this embodiment is configured such that a treat 18 formed by covering an organic fiber cord with rubber, for example, is directed so as to change its direction at both tire widthwise ends toward a tire width direction inner side such that it extends in zigzags fashion in the tire circumferential direction.

As used herein, the term "endless" for the endless belt layer 16 means that there is no cut surface in the organic fiber cord at any of the tire widthwise ends.

The spiral belt layer 15 according to this embodiment is formed by being spirally wound around the tire axial direction on the tire circumferential surface. For example, six to eight such spiral belt layers 15 are provided.

In the endless belt layer 16 according to this embodiment, a front surface a and a rear surface b of each treat 18 are reversed, and on at least one tire widthwise end of the treats 18, a treat reversal position at which the front surface a and the rear surface b of each treat 18 are reversed is, at least partially in the tire circumferential direction, displaced in the tire width direction from another treat reversal position adjacent in the tire circumferential direction. For example, two such endless belt layers 16 are provided.

Figure 2:
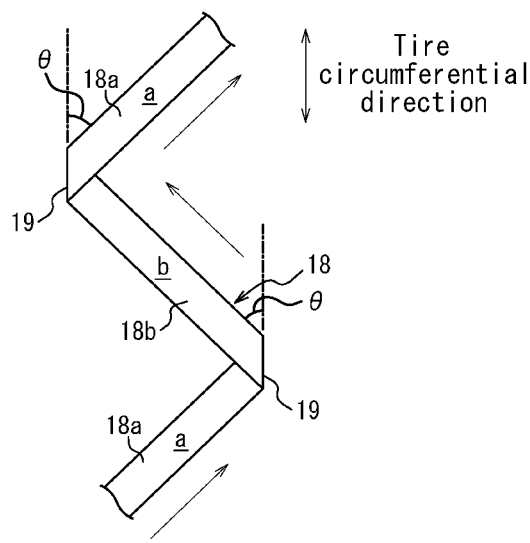
FIG. 2 is an explanatory diagram conceptually illustrating a zigzag arrangement of an endless belt layer in the pneumatic tire of FIG. 1.

As illustrated in FIG. 2, each of the treats 18 according to this embodiment forming the corresponding endless belt layer 16 is formed by right-up inclined portions 18a extending in a right-rising manner in the tire width direction and left-up inclined portions 18b extending in a left-rising manner in the tire width direction that are alternately repeated in a continuous manner on a plane on which the tire circumferential surface is formed. Assuming that one of the outer surfaces of each treat 18 is defined as a front surface a and the other as a rear surface b, the front surface a and the rear surface b of each treat 18 are reversed at both tire widthwise ends, and on at least one tire widthwise end of the treats 18, a treat reversal position at which the front surface a and the rear surface b of each treat are reversed is, at least partially in the tire circumferential direction, displaced in the tire width direction from another treat reversal position adjacent in tire circumferential direction.

In this embodiment, the right-up inclined portions 18a and the left-up inclined portions b are arranged such that as each right-up inclined portion 18a extends from one end side in the tire width direction of the corresponding treat 18 (in this example, the left end side in FIG. 2) toward the other end side in the tire width direction (in this example, the right end side in FIG. 2), it extends toward one side in the tire circumferential direction (in this example, the upper side in FIG. 2), while as each left-up inclined portion 18b extends from the other end side in the tire width direction (in this example, the right end side in FIG. 2) toward the one end side (in this example, the left end side in FIG. 2), it extends toward one side in the tire circumferential direction (in this example, the upper side in FIG. 2).

Figure 3:
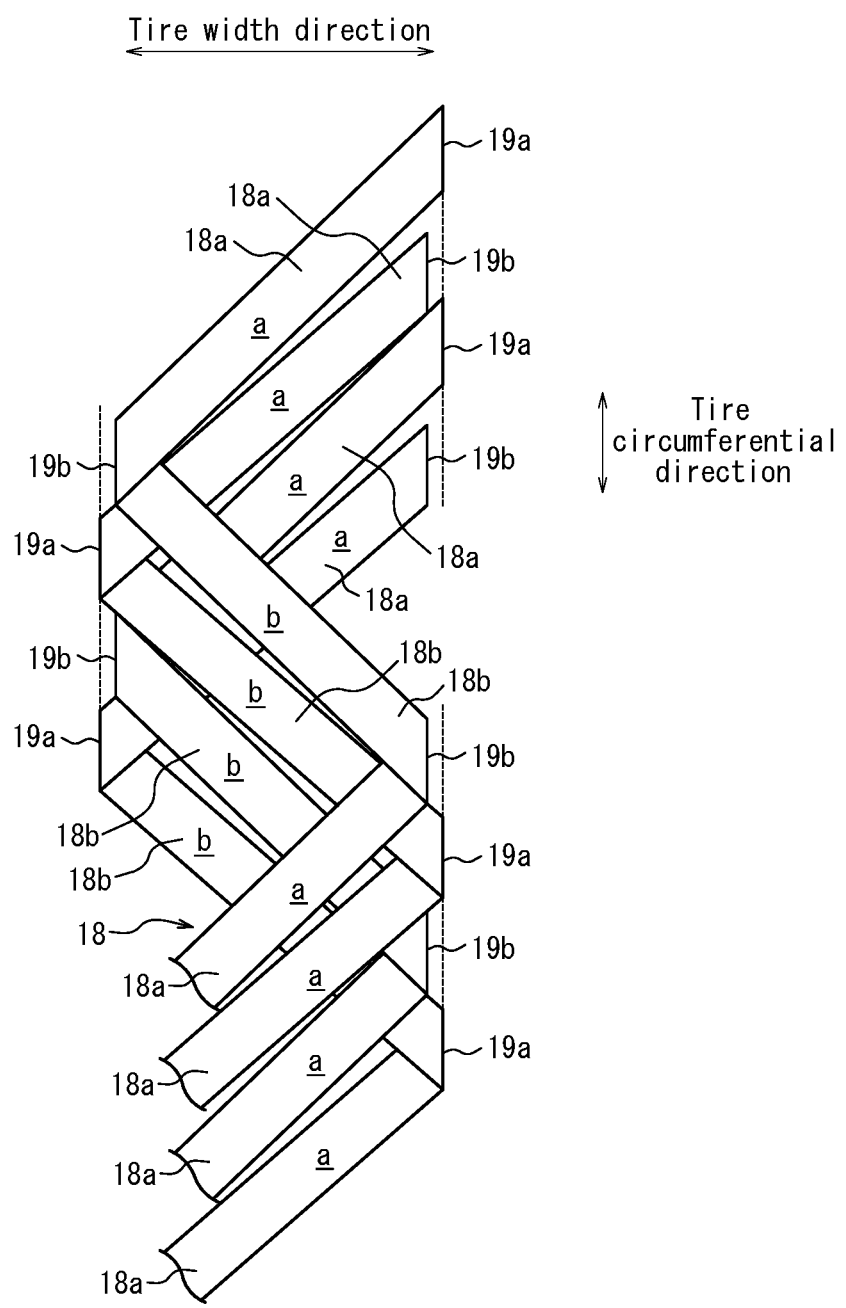
FIG. 3 is an explanatory development view illustrating how the endless belt layer is wound in the pneumatic tire of FIG. 1.

As illustrated in FIG. 3, in this embodiment, assuming a series of one right-up inclined portion 18a and one left-up inclined portion 18b of a treat 18 as one turn, this turn is repeated continuously in the tire circumferential direction such that treats 18 are disposed over the spiral belt layer 15 so as to be affixed to the entire formation surface on which the corresponding endless belt layer 16 is to be formed. One turn may correspond to, for example, a full round of the circumference of the tire circumferential surface (0° to 360°) or a half round (0° to 180°). The circumference of the tire circumferential surface is formed of one turn in the former case, and two turns in the latter case. However, it is not particularly limited how many rounds of the circumference of the tire circumferential surface one turn forms.

In this embodiment, the direction of extension of each treat 18 in the tire width direction is reversed at each tire widthwise end of the treat, and at each point where the direction of extension is reversed, the treat 18 is folded back so as to be symmetrical about the tire width direction (tire widthwise line) along each tire widthwise end (or, each line parallel to the tire widthwise end) as a crease, whereby the front surface a and the rear surface b of the treat 18 are reversed (turned over) (see FIGS. 2 and 3).

Further, in the endless belt layer 16 according to this embodiment, the front surface a and the rear surface b of each treat 18 are reversed at both tire widthwise ends, and on at least one tire widthwise end of the treats 18, a treat reversal position at which the front surface a and the rear surface b of each treat 18 are reversed is, at least partially in the tire circumferential direction, displaced in the tire width direction from another treat reversal position adjacent in the tire circumferential direction.

That is, as illustrated in FIG. 3, in this embodiment, assuming one turn corresponding to a full round of the circumference of the tire circumferential surface, a treat reversal position 19 at which the front and rear surfaces of each treat 18 are reversed is displaced from another treat reversal position, for example, in the following way: in the first tire circumferential round, the tire widthwise position of a treat 18 is located at each tire widthwise end (indicated as 19a in the figure), in the second tire circumferential round, another treat 18 is located inward in the tire width direction of each tire widthwise end, i.e., on each tire widthwise end inner side (indicated as 19b in the figure), in the third tire circumferential round, another treat 18 is located at each tire widthwise end (indicated as 19a in the figure), in the fourth tire circumferential round, another treat 18 is located on each tire widthwise end inner side (indicated as 19b in the figure), and so on. That is, the tire widthwise positions of the treats 18 are shifted (offset) in the tire circumferential direction between adjacent ones (see the broken line in the figure) such that in the odd-numbered tire circumferential rounds, the tire widthwise positions of the treats 18 are located at each tire widthwise end (indicated as 19a in the figure), and in the even-numbered tire circumferential rounds, the tire widthwise positions of the treats 18 are located on each tire widthwise end inner side (indicated as 19b in the figure).

In this way, each treat 18 is folded back along a tire circumferential line as a crease, the front surface a and the back surface b of the treat 18 are reversed, and the treat reversal position 19 of the treat 18 is displaced in the tire width direction from another one for each tire circumferential round. Thus, it is possible to eliminate the occurrence of wide overlapping portions where redundant parts of treats 18 forming the endless belt layer 16 overlap one another. That is, since each treat 18 has no linear portion at any of the tire widthwise ends, even with long linear portions, there will be no wide overlapping portions where redundant parts of the treats 18 overlap one another at the linear portions. In addition, reversed parts of each treat 18 prevent bent portions that respectively continue from linear portions to inclined portions from being lifted or turned up.

In this embodiment, the treats 18 are folded such that the treat reversal positions 19 are displaced in the tire width direction from one another for each tire circumferential round, that is, the tire widthwise positions of the treat reversal positions 19 are shifted (offset), rather than matched, in the tire circumferential direction between adjacent treat reversal positions 19. The position to be shifted (offset) in the tire circumferential direction and the amount to be shifted (offset) in the tire width direction are not limited to constant intervals or the same amount, and may be adjusted as necessary, for example, every turn, depending on the arrangement of the treats 18, such as the degree of overlap between adjacent treats 18.

For example, as illustrated in FIG. 3, if treats 18 are disposed so as to eliminate the overlap between right-up inclined portions 18a and between left-up inclined portions 18b adjacent to one another in the tire circumferential direction, respectively, it is possible to completely eliminate overlapping portions where redundant parts of the treats 18 overlap one another.

Further, in this embodiment, the inclination angle of each treat 18 with respect to the tire circumferential direction, that is, the inclination angle θ of each right-up inclined portion 18a and each left-up inclined portion 18b (see FIG. 2) is preferably more than 10° and less than 90° (10°<θ<90°), and more preferably more than 45° and less than 90° (45°<θ<90°). If the inclination angle exceeds 10°, the circumferential rigidity can be secured more preferentially than the lateral rigidity, if it exceeds 45°, the wear rate can be reduced by increased lateral rigidity, and if it is less than 90°, the wear rate can be further reduced by further increased lateral rigidity.

Next, an example of a method for manufacturing the pneumatic tire 10 (for example, an aircraft tire) according to this embodiment described above will be described.

This method comprises the step of forming the endless belt layer 16 used for the belt 13 (a forming process). In the forming step, as illustrated in FIGS. 4A, 4B, 4C, and 4D, the endless belt layer 16 in this example is formed by continuously winding a treat 18 formed by covering a cord with rubber in zigzag fashion on a forming rotator (drum) 20. When the treat 18 is wound, a head portion 21 of the belt forming device is rotated at each end of the reciprocating traverse in the tire width direction (see FIGS. 4B and 4D) to change the winding direction of the treat 18 such that the front surface a and the rear surface b of the treat 18 are reversed.

Figure 4A:
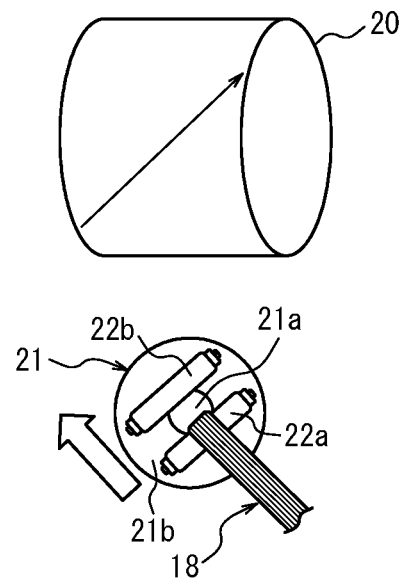
FIG. 4A is an explanatory diagram illustrating the movement of a head portion of the endless belt layer during right-up inclined movement in an example of the forming process for production of the pneumatic tire illustrated in FIG. 1.
Figure 4B:
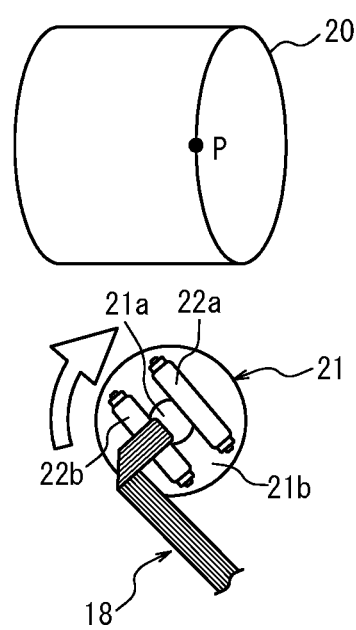
FIG. 4B is an explanatory diagram illustrating the movement of the head portion of the endless belt layer during clockwise rotation in an example of the forming process for production of the pneumatic tire illustrated in FIG. 1.
Figure 4C:
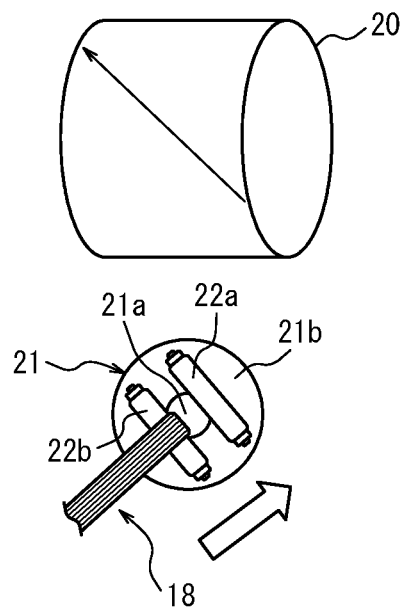
FIG. 4C is an explanatory diagram illustrating the movement of the head portion of the endless belt layer during left-up inclined movement in an example of the forming process for production of the pneumatic tire illustrated in FIG. 1.
Figure 4D:
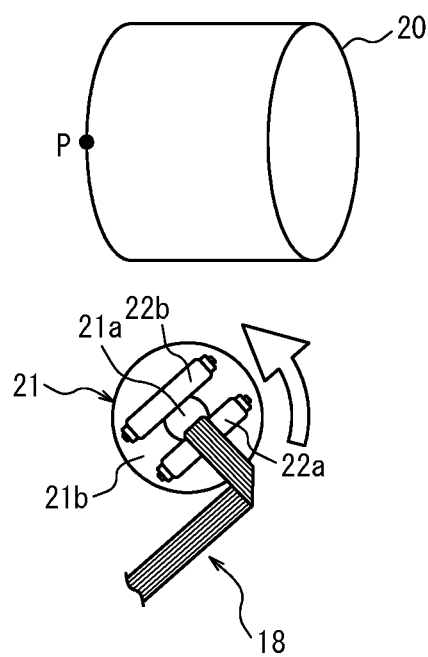
FIG. 4D is an explanatory diagram illustrating the movement of the head portion of the endless belt layer during counterclockwise rotation in an example of the forming process for production of the pneumatic tire illustrated in FIG. 1.
Figure 5A:
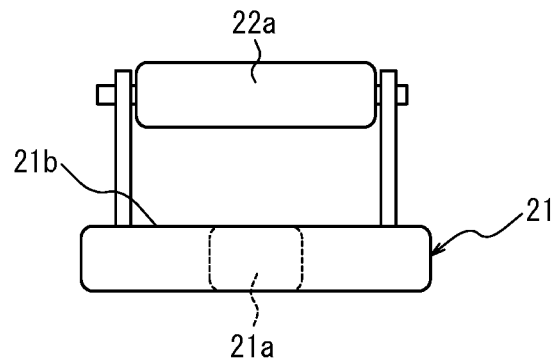
FIG. 5A is a front view illustrating the head portion used for production of the pneumatic tire illustrated in FIG. 1.
Figure 5B:
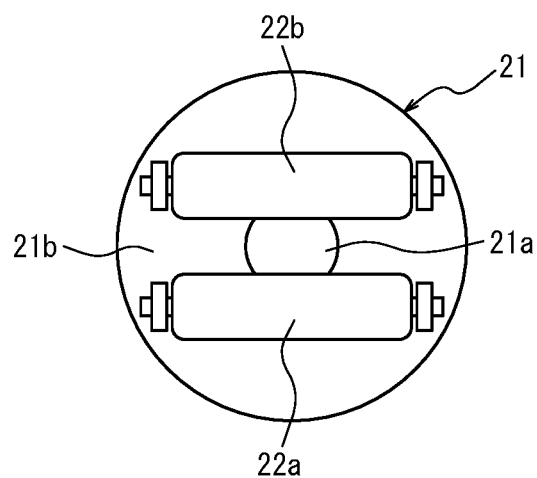
FIG. 5B is a plan view illustrating the head portion used for production of the pneumatic tire illustrated in FIG. 1.
Figure 5C:
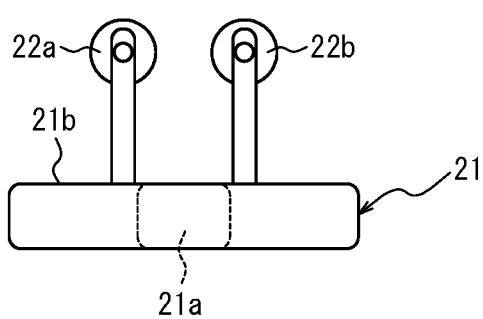
FIG. 5C is a side view illustrating the head portion used for production of the pneumatic tire illustrated in FIG. 1.

As illustrated in FIGS. 5A, 5B, and 5C, for example, the head portion 21 in this example is formed in a disk-like shape having an opening 21a penetrating substantially the center of the disk surface, has two rollers, a first roller 22a and a second roller 22b (see FIG. 5B), for guiding treats 18 individually, and is provided with a rotation mechanism (not illustrated) that enables rotation of the forming rotator 20 on the winding surface. One of the surfaces of the heat portions 21 is disposed to face the outer surface of the forming rotator 20. In FIGS. 4A, 4B, 4C, and 4D, the facing surface 21b of the head portion 21 that faces the outer surface of the forming rotator 20 is illustrated as a surface for reference (in a plan view). In fact, when forming the endless belt layer 16, the illustrated facing surface 21b is directed to face the outer surface of the forming rotator 20.

In this example, the first roller 22a and the second roller 22b have substantially the same shape made of, for example, a cylindrical rotator (see FIGS. 5A and 5B). The first roller 22a and the second roller 22b are spaced above from the facing surface 21b of the head portion 21 and disposed in substantially parallel spaced relation with each other (see FIGS. 5B and 5C), and are pivotally supported so as to be pivotable about the axis. In this example, the head portion 21 rotates approximately 90° to the left and right on the facing surface 21b about the center of the disk-like surface as a rotation axis, such that the first roller 22a and the second roller 22b can also be rotated approximately 90° to the left and right on the facing surface 21b.

In this example, the endless belt layer 16 is formed through the following forming process using the above-described forming rotator 20 and head portion 21 (see FIGS. 4A, 4B, 4C, and 4D).

As will be described later, the following forming process (see FIGS. 4A, 4B, 4C, and 4D) focuses on three points: (i) two rollers (in this example, the first roller 22a and the second roller 22b) are provided; (ii) a rotation mechanism for rotating the two rollers is provided; and (iii) the head portion 21 of the belt forming device is rotated at each end of the reciprocating traverse in the tire width direction such that the rotation direction is reversed at the right and left ends to prevent the treat 18 from twisting while changing the winding direction.

First, the treat 18 is positioned on the facing surface 21b side of the head portion 21 through the opening 21a and guided by the first roller 22a, and in this state the treat 18 is affixed to the outer surface of the forming rotator 20 while moving the head portion 21 on the outer surface of the rotating forming rotator 20 in a right-up inclined direction from the widthwise left end side toward the widthwise right end side (see the arrow in FIG. 4A). As a result, a right-up inclined portion 18a is formed with the front surface a side of the treat 18 facing upward (see FIG. 3).

Then, when the head portion 21 reaches a widthwise right end point P on the outer surface of the forming rotator 20, the rotation of the forming rotator 20 is stopped, and while the treat 18 being positioned on the facing surface 21*b* side of the head portion 21 through the opening 21*a*, the head portion 21 is rotated approximately 90° clockwise (see the arrow in FIG. 4B) such that the treat 18 is guided by the second roller 22*b* (see FIG. 4B). The rotation of the head portion 21 causes the treat 18 to be folded back at a tire widthwise end along a tire circumferential line as a crease such that the front surface a and the rear surface b of the treat 18 are reversed, with the rear surface b side facing upward, and the treat 18 is folded back (see FIG. 4B) at a treat reversal position 19 as a tire widthwise end 19*a* (see FIG. 3).

Then, while the treat 18 being positioned on the facing surface 21*b* side of the head portion 21 through the opening 21*a* and being guided by the second roller 22*b*, the treat 18 is affixed to the outer surface of the forming rotator 20 while moving the head portion 21 on the outer surface of the rotating forming rotator 20 in a left-up inclined direction from the widthwise right end side toward the widthwise left end side (see the arrow in FIG. 4C). As a result, a left-up inclined portion 18*b* is formed with the rear surface b side of the treat 18 facing upward (see FIG. 3).

Then, when the head portion 21 reaches a widthwise left end point P on the outer surface of the forming rotator 20, the rotation of the forming rotator 20 is stopped, and while the treat 18 being positioned on the facing surface 21*b* side of the head portion 21 through the opening 21*a*, the head portion 21 is rotated approximately 90° counterclockwise (see the arrow in FIG. 4D) such that the treat 18 is guided by the first roller 22*a* (see FIG. 4D). The rotation of the head portion 21 causes the treat 18 to be folded back at a tire widthwise end along a tire circumferential line as a crease such that the rear surface b and the front surface a of the treat 18 are reversed, with the front surface a side facing upward, and the treat 18 is folded back (see FIG. 4D) at a treat reversal position 19 as a tire widthwise end inner side 19*b* (see FIG. 3).

Through the above process, the treat 18 is folded back along each tire widthwise end 19*a* as a crease such that the front surface a and the rear surface b of the treat 18 are reversed to provide one right-up inclined portion 18*a* and one left-up inclined portion 18*b*, a combination of which is taken as one turn, and this one turn forms the first tire circumferential round of the treat 18 (see FIG. 3).

Subsequently, the movement of the head portion 21 in the right-up inclined direction (see FIG. 4A), the rotation of the head portion 21 in the clockwise direction (see FIG. 4B), the movement of the head portion 21 in the left-up inclined direction (see FIG. 4C), and the rotation of the head portion 21 in the counterclockwise direction (see FIG. 4D) are repeated in the stated order to form the second tire circumferential round of the treat 18. In the second round, during the clockwise rotation of the heat portion 21 (see FIG. 4B), the rotation position of the head portion 21 (i.e., the position on the forming rotator 20 at which the head portion 21 is rotated) is set at, for example, a position retracted inward from the widthwise right end, not at the widthwise right end in the first round, on the outer surface of the forming rotator 20. Similarly, when the head portion 21 is rotated counterclockwise (see FIG. 4D), the rotation position of the head portion 21 is set at, for example, a position retracted inward from the widthwise left end, not at the widthwise left end in the first round, on the outer surface of the forming rotator 20.

Thus, in this example, by setting the rotation position of the head portion 21 in the second tire circumferential round of a treat 18 at, for example, a position retracted inward from each widthwise end, not at each widthwise end, on the outer surface of the forming rotator 20, treat reversal positions 19 adjacent in the tire circumferential direction at which treats 18 are folded back in the first and second tire circumferential rounds of the treats 18 can be shifted (offset), rather than matched, in the tire width direction between the treats 18 adjacent to each other in the tire circumferential direction (see FIG. 3).

Subsequently, the movement of the head portion 21 in the right-up inclined direction (see FIG. 4A), the rotation of the head portion 21 in the clockwise direction (see FIG. 4B), the movement of the head portion 21 in the left-up inclined direction (see FIG. 4C), and the rotation of the head portion 21 in the counterclockwise direction (see FIG. 4D) are repeated in the stated order with the treat reversal positions 19 at which treats 18 are folded back being displaced in the tire width direction between odd-numbered and even-numbered tire circumferential rounds (see FIG. 3), and the treats 18 are affixed to the entire formation surface on which the endless belt layer 16 is to be formed.

When the treat reversal positions 19 at which treats 18 are folded back are displaced in the tire width direction (see FIG. 3), in addition to merely rotating the head portion 21 in which the first roller 22*a* and the second roller 22*b* are arranged side by side approximately 90° to the left and right on the facing surface 21*b*, it is also possible to finely adjust the rotation angle of the head portion 21 as necessary to eliminate the occurrence of wide overlapping portions where redundant parts of folded treats 18 overlap one another. By finely adjusting the rotation angle of the head portion 21, the treat 18 that is folded back while being guided by the first roller 22*a* or the second roller 22*b* can take a trajectory to prevent the occurrence of wide overlapping portions where redundant parts of the treat 18 on the forming rotator 20 overlap one another.

Further, in the above example, when the treat 18 is affixed to the outer surface of the forming rotator 20, the head portion 21 is moved in the right-up or left-up inclined direction while the forming rotator 20 is caused to rotate. However, the head portion 21 may be simply moved to the left and right while the forming rotator 20 is caused to rotate.

In this way, by forming the endless belt layer 16 through the above-described steps using the forming rotator 20 and the head portion 21 in this example, it is possible to set the folding angle freely for folding back each treat 18, while making adjustments such that redundant parts where treats 18 overlap one another would not be formed widely or not at all. This setup can relax the rigidity in the tire circumferential direction, reduce the incidence of uneven shoulder wear, and eliminate the possibility of contact between cords inside the belt during vulcanization, avoiding the occurrence of a starting point of separation between belts.

Further, in this example, two rollers (the first roller 22*a* and the second roller 22*b*) are arranged in parallel, and a treat 18 is wound around the forming rotator 20 via the head portion 21 that can be rotated to the left and right on the facing surface 21*b*. With this setup, at the time of winding a treat 18, the treat 18 can be folded back easily and the inclination angle of the treat 18 can be finely adjusted with ease.

Further, the head portion 21 in this example contains the first roller 22*a* and the second roller 22*b* arranged side by side, and can be rotated to the left and right on the facing surface 21*b*. Since this rotation is accomplished in the same plane facing the outer surface of the forming rotator 20, it is easy to finely adjust the rotation angle of the head portion 21, i.e., the first roller 22*a* and the second roller 22*b* (for example, by 1° or 2°), and the rotation angle can be controlled simply by adjusting the amount of rotation.

Further, in this example, although the affixing of the wound treat 18 is performed while the first roller 22a and the second roller 22b are always kept in tension, it is easy to make adjustments to keep the tension constantly applied to the rollers since the first roller 22a and the second roller 22b are arranged in parallel side by side in the same plane facing the outer surface of the forming rotator 20.

Furthermore, in the forming process of the endless belt layer 16 in this example, when treats 18 are folded back, the direction of the treats 18 can be changed at each tire widthwise end with a slight shift or in a curved manner. With this configuration, it is ensured that the treats 18 do not overlap when folded back.

REFERENCE SIGNS LIST

- 10: pneumatic tire
- 11: bead portion
- 11a: bead core
- 12: carcass
- 13: belt
- 14: tread
- 14a: circumferential groove
- 15: spiral belt layer (belt layer)
- 16: endless belt layer (belt layer)
- 17: belt protective layer
- 18: treat
- 18a: right-up inclined portion
- 18b: left-up inclined portion
- 19: treat reversal position
- 19a: tire widthwise end
- 19b: tire widthwise end inner side
- 20: forming rotator
- 21: head portion
- 21a: opening
- 21b: facing surface
- 22a: first roller
- 22b: second roller
- CL: tire equatorial plane
- P: end point
- a: front surface
- b: rear surface
- θ: inclination angle

The invention claimed is:

1. A pneumatic tire comprising:
a carcass extending toroidally between a pair of bead portions;
a belt formed by at least one belt layer disposed outward of the carcass in a tire radial direction; and
a tread disposed outward of the belt in the tire radial direction,
the belt layer comprising an endless belt layer having provided therein treats, each of the treats being formed by covering a cord with rubber and directed so as to change direction at both tire widthwise ends toward a tire width direction inner side such that the treat extends in zigzag fashion in the tire circumferential direction, wherein
in the endless belt layer,
a front surface and a rear surface of each of the treats are reversed at both tire widthwise ends,
on at least one tire widthwise end of the treats, a treat reversal position at which front and rear surfaces of each of the treats are reversed is, at least partially in the tire circumferential direction, displaced in the tire width direction from another treat reversal position adjacent in the tire circumferential direction, and
the treat reversal positions are alternatively displaced between a widthwise end position and a widthwise inner side position in the tire width direction for each tire circumferential round.

2. The pneumatic tire according to claim 1, wherein an inclination angle of each of the treats with respect to the tire circumferential direction is more than 45° and less than 90°.

3. The pneumatic tire according to claim 1, wherein a displacement width between the treat reversal positions of the treats at each of the tire widthwise ends of the treats is not wider than a width of each of the treats.

4. The pneumatic tire according to claim 1,
further comprising a belt protective layer disposed between the belt and the tread in the tire radial direction,
wherein the belt includes a spiral belt layer disposed inward of the endless belt layer in the tire radial direction.

* * * * *